US007175391B2

(12) United States Patent
Chlus et al.

(10) Patent No.: US 7,175,391 B2

(45) Date of Patent: Feb. 13, 2007

(54) TURBINE BLADE

(75) Inventors: Wieslaw A. Chlus, Wethersfield, CT (US); Jesse R. Christophel, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 120 days.

(21) Appl. No.: 10/888,125

(22) Filed: Jul. 8, 2004

(65) Prior Publication Data

US 2006/0008350 A1 Jan. 12, 2006

(51) Int. Cl.
*B64C 11/24* (2006.01)

(52) U.S. Cl. .................... 416/92; 416/96 A; 416/96 R

(58) Field of Classification Search .............. 416/96 R, 416/82, 97 R, 96 A, 232, 92

See application file for complete search history.

(56) References Cited

U.S. PATENT DOCUMENTS

| | | | | |
|---|---|---|---|---|
| 2,801,073 | A * | 7/1957 | Savage | 416/96 A |
| 3,533,712 | A | 10/1970 | Kercher | |
| 3,885,886 | A | 5/1975 | Richter | |
| 3,982,851 | A | 9/1976 | Andersen et al. | |
| 4,010,531 | A | 3/1977 | Andersen et al. | |
| 4,020,538 | A * | 5/1977 | Dennis et al. | 29/889.721 |
| 4,073,599 | A | 2/1978 | Allen et al. | |
| 4,214,355 | A * | 7/1980 | Zelahy | 29/889.1 |
| 4,411,597 | A * | 10/1983 | Koffel et al. | 416/97 R |
| 4,589,824 | A * | 5/1986 | Kozlin | 416/97 R |
| 4,893,987 | A * | 1/1990 | Lee et al. | 416/97 R |
| 5,052,889 | A * | 10/1991 | Abdel-Messeh | 416/97 R |
| 5,564,902 | A | 10/1996 | Tomita | |
| 5,971,708 | A * | 10/1999 | Lee | 416/97 R |
| 6,347,923 | B1 * | 2/2002 | Semmler et al. | 416/97 R |
| 6,367,687 | B1 * | 4/2002 | Reeves et al. | 228/206 |
| 2003/0026698 | A1 * | 2/2003 | Flodman et al. | 416/97 R |
| 2004/0076519 | A1 | 4/2004 | Halfmann et al. | |
| 2005/0238488 | A1 * | 10/2005 | Eastman et al. | 416/97 R |

FOREIGN PATENT DOCUMENTS

| | | |
|---|---|---|
| JP | 6-76601 | 10/1994 |
| JP | 2001-107701 | 4/2001 |

* cited by examiner

*Primary Examiner*—Richard A. Edgar
(74) *Attorney, Agent, or Firm*—Bachman & LaPointe, P.C.

(57) ABSTRACT

A blade has an airfoil body having an internal cooling passageway network and a body tip pocket. At least one plate is secured within the body tip pocket and has inboard and outboard surfaces. A recess is in the outboard surface and an associated protrusion is on the inboard surface.

21 Claims, 2 Drawing Sheets

TURBINE BLADE

BACKGROUND OF THE INVENTION

This invention relates to turbomachinery, and more particularly to cooled turbine blades.

Heat management is an important consideration in the engineering and manufacture of turbine blades. Blades are commonly formed with a cooling passageway network. A typical network receives cooling air through the blade platform. The cooling air is passed through convoluted paths through the airfoil, with at least a portion exiting the blade through apertures in the airfoil. These apertures may include holes (e.g., “film holes” distributed along the pressure and suction side surfaces of the airfoil and holes at junctions of those surfaces at leading and trailing edges. Additional apertures may be located at the blade tip. In common manufacturing techniques, a principal portion of the blade is formed by a casting and machining process. During the casting process a sacrificial core is utilized to form at least main portions of the cooling passageway network. Proper support of the core at the blade tip is associated with portions of the core protruding through tip portions of the casting and leaving associated holes when the core is removed. Accordingly, it is known to form the casting with a tip pocket into which a plate may be inserted to at least partially obstruct the holes left by the core. This permits a tailoring of the volume and distribution of flow through the tip to achieve desired performance. Examples of such constructions are seen in U.S. Pat. Nos. 3,533,712, 3,885,886, 3,982,851, 4,010,531, 4,073,599 and 5,564,902. In a number of such blades, the plate is subflush within the casting tip pocket to leave a blade tip pocket or plenum.

Failures of the plates due to combinations of thermal/mechanical fatigue and corrosion are well known.

BRIEF SUMMARY OF THE INVENTION

Accordingly, one aspect of the invention involves a blade having an airfoil body with an internal cooling passageway network and a body tip pocket. At least one plate is secured within the body tip pocket and has inboard and outboard surfaces. There is a recess in the outboard surface and an associated protrusion on the inboard surface.

In various implementations, the recess may have a depth of 30–200% of an adjacent thickness of the plate and the protrusion may have a height of 30–200% of an adjacent thickness of the plate. The recess may have a maximum transverse dimension of no more than 500% of an adjacent thickness of the plate and a minimum transverse dimension of no less than 50% of the maximum transverse dimension. There may be a number of such recesses and protrusions in combination opposite each other. The recesses may have centers within 20% of a mean line of the plate. The plate may be a single plate. The plate may have a perimeter and may be welded to the airfoil body along at least 90% of the perimeter. The plate may be welded to the airfoil body along essentially an entirety of the perimeter. The body tip pocket may be in communication with the cooling passageway network via a plurality of ports. The plate may have at least one through-aperture. The plate may be secured subflush within the body tip pocket so as to leave a blade tip plenum. The body tip pocket may have an uninterrupted perimeter wall.

Another aspect of the invention involves a method for manufacturing a blade. A blade body is formed including a casting step. A plate is formed including indenting a number of indentations in a first surface of the plate. The plate is inserted into a tip pocket of the body. The plate is secured to the body.

In various implementations, a plurality of through-apertures may be drilled in the plate. The indenting may produce a number of protrusions from a second surface, opposite the first surface. The securing may include welding along a perimeter of the plate. The blade may be installed on a gas turbine engine in place of a prior blade, the prior blade lacking the indentations.

Another aspect of the invention involves a blade having an airfoil body with an internal cooling passageway network and a body tip pocket in communication with the cooling passageway network via a plurality of ports. At least one plate is secured within the body tip pocket subflush to the tip so as to leave a blade tip pocket adjacent the tip and at least partially blocking at least some of the ports. The plate has means for relieving cyclical thermal stresses.

In various implementations, the means may include a number of aligned pairs of outboard surface recesses and inboard surface protrusions. The body may consist in major part of a nickel- or cobalt-based superalloy. The plate may consist essentially of a nickel- or cobalt-based superalloy.

Another aspect of the invention involves a method for reengineering a turbine engine blade configuration from a first configuration to a reengineered configuration. The first configuration includes an airfoil body having an internal cooling passageway network and a body tip pocket in communication with the cooling passageway network via a number of ports. A plate has essentially flat inboard and outboard surfaces secured within the body tip pocket, subflush to the tip so as to leave a blade tip pocket adjacent the tip and at least partially blocking at least some of the ports. In one or more iterations, the reengineered configuration is provided having an airfoil body with an internal cooling passageway network and a body tip pocket in communication with the cooling passageway network via a number of ports. A plate has inboard and outboard surfaces and is secured within the body tip pocket, subflush to the tip so as to leave a blade tip pocket adjacent the tip and at least partially blocking at least some of the ports. The plate has at least one surface enhancement effective to improve resistance to thermal/mechanical fatigue relative to the first configuration.

In various implementations, the surface enhancement may include an indentation. The reengineered configuration airfoil body may be essentially unchanged relative to the first configuration airfoil body.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
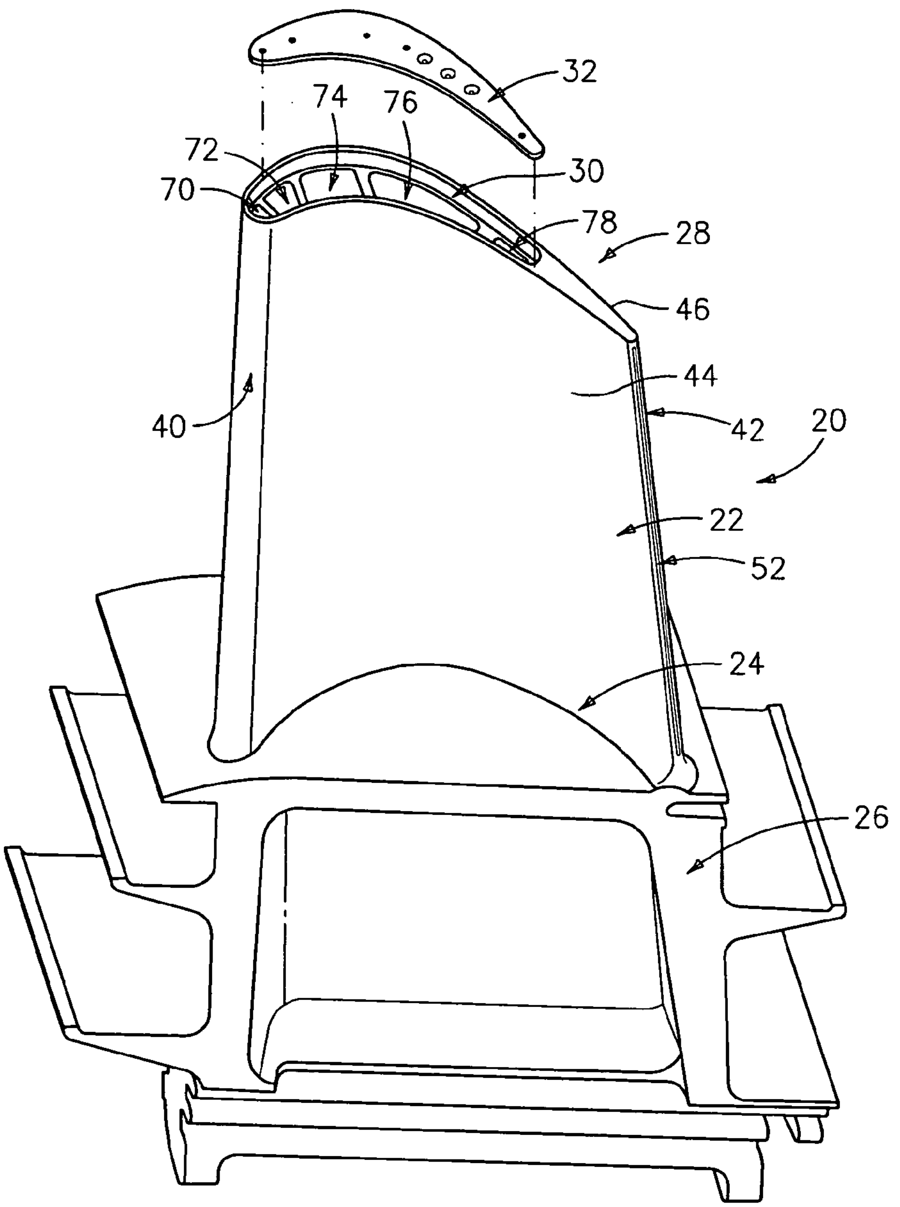
FIG. 1 is an exploded view of a turbine blade according to principles of the invention.

FIG. 1 shows a turbine blade 20 having an airfoil 22 extending along a length from a proximal root 24 at an inboard platform 26 to a distal end tip 28. A number of such blades may be assembled side-by-side with their respective inboard platforms forming a ring bounding an inboard portion of a flowpath. In an exemplary embodiment, a principal portion of the blade is unitarily formed of a metal alloy (e.g., as a casting). The casting is formed with a tip compartment 30 in which a separate cover plate 32 (FIG. 2) is secured in place (FIG. 3).

The airfoil extends from a leading edge 40 to a trailing edge 42. The leading and trailing edges separate pressure and suction sides or surfaces 44 and 46. For cooling the blade, the blade is provided with a cooling passageway network 50 (FIG. 4) coupled to ports (not shown) in the platform. The exemplary passageway network includes a series of cavities extending generally lengthwise along the airfoil. A foremost cavity is identified as a leading edge cavity extending generally parallel to the leading edge. An aftmost cavity is identified as a trailing edge cavity extending generally parallel to the trailing edge. These cavities may be joined at one or both ends and/or locations along their lengths. The network may further include holes extending to the pressure and suction surfaces 44 and 46 for further cooling and insulating the surfaces from high external temperatures. Among these holes may be a trailing edge outlet slot 52 (FIG. 3). Alternatively to the slot, there may be an array of trailing edge holes extending between the trailing edge cavity and a location proximate the trailing edge.

In an exemplary embodiment, the principal portion of the blade is formed by casting and machining. The casting occurs using a sacrificial core to form the passageway network. An exemplary casting process forms the resulting casting with the aforementioned casting tip compartment 30 (FIG. 1). The compartment has a circumferential shoulder 53 having an outboard surface 54 cooperating with outboard ends 56 of passageway dividing walls 58 (FIG. 4) to form a base of the casting tip compartment. The base is below a rim 60 of a wall structure having portions 62 and 64 (FIG. 3) on pressure and suction sides of the resulting airfoil. The base is formed with a series of apertures (FIG. 1) 70, 72, 74, 76, and 78 from leading to trailing edge. These apertures may be formed by portions of the sacrificial core mounted to an outboard mold for support. The apertures are in communication with the passageway network. The apertures may represent an undesired pathway for loss of cooling air from the blade. Accordingly it is advantageous to fully or partially block some or all of the apertures with the cover plate 32.

Figure 4:
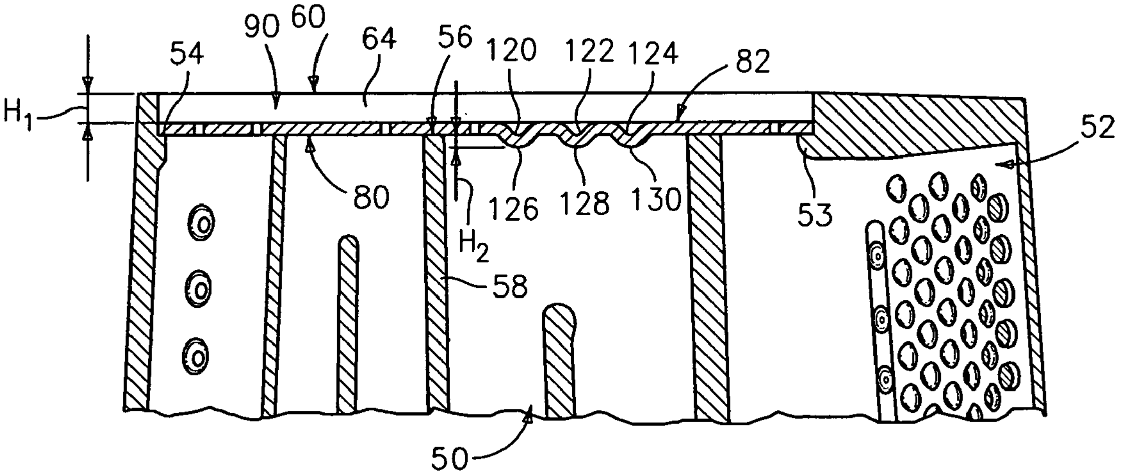
FIG. 4 is a mean sectional view of the tip of the blade of FIG. 1.

The cover plate 32 has inboard and outboard surfaces 80 and 82 (FIG. 4). The cover plate inboard surface 80 lies flat against the shoulder outboard surface 54 and wall ends 56. The cover plate outboard surface 82 lies recessed (subflush) below the rim 60 by a height $H_1$ to leave a blade tip pocket or compartment 90. In operation, the rim 60 (subject to recessing described below) is substantially in close proximity to the interior of the adjacent shroud (e.g., with a gap of about 0.1 inch).

The cover plate 32 (FIG. 2) is initially formed including a perimeter having a first portion 100 generally associated with the contour of the airfoil pressure side and a second portion 102 generally associated with the airfoil suction side. Exemplary cover plate material is nickel-based superalloy (e.g., UNS N06625 0.03–0.05 inch thick). The portions 100 and 102 are (subject to potential departures described below) dimensioned to closely fit within the tip compartment adjacent the interior surface of the wall structure portions 62 and 64.

The cover plate 32 is installed by positioning it in place in the casting compartment and welding or brazing it to the casting along all or part of the perimeter portions 100 and 102. Specifically, in the illustrated embodiment, the plate is laser welded to the casting a full 360° around its perimeter. It may alternatively be fillet welded (e.g., MIG or TIG welded) on all or part of the perimeter.

Figure 2:
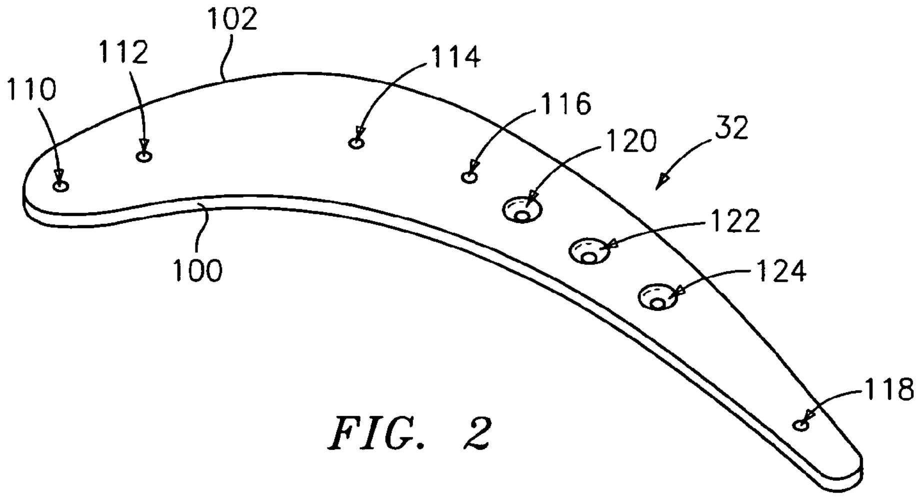
FIG. 2 is a view of a cover plate for a tip compartment of the blade of FIG. 1.
Figure 3:
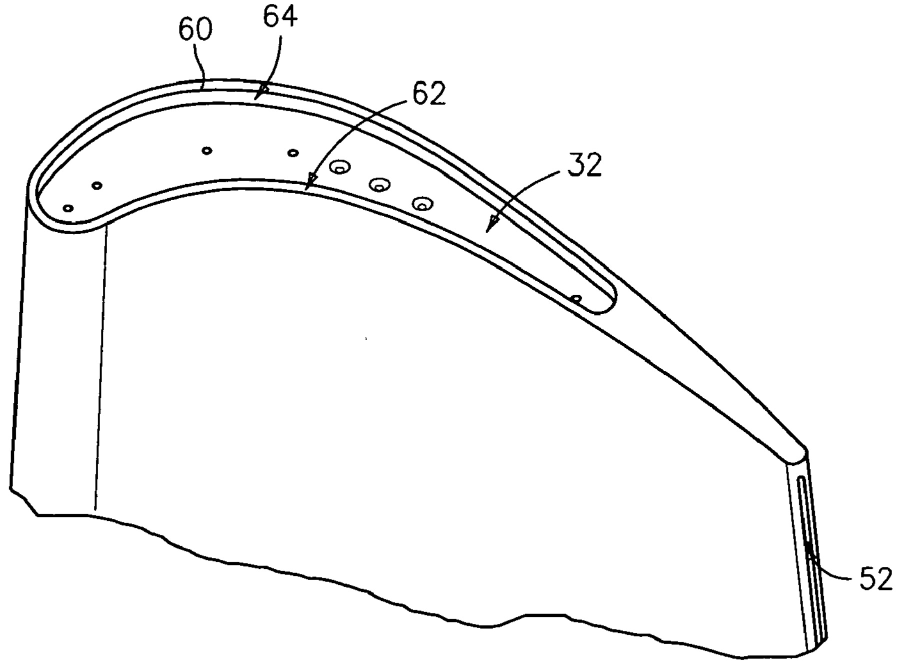
FIG. 3 is a view of the tip of the blade of FIG. 1.

FIG. 2 further shows the cover plate 32 as including a series of through-apertures 110, 112, 114, 116, and 118 generally proximate a mean of the airfoil section and each in communication with an associated one of the compartments 70, 72, 74, 76, and 78. The exemplary through-apertures are formed by drilling and have circular cylindrical surfaces. The through-apertures serve to introduce air to the blade tip compartment to cool the tip and to evacuate contaminants (e.g., dust) from the cooling passageway network 50.

FIG. 2 further shows the cover plate outboard surface 82 as including a plurality of recessed areas 120, 122, and 124. These are aligned with associated protrusions 126, 128, and 130 from the inboard surface 80 (FIG. 4). The protrusions have a height $H_2$ above a remainder of the otherwise planar inboard surface 80 which may be approximately similar to the recessing of the recesses below the remainder of the outboard surface 82. The recess/protrusion pairs may each be formed by indenting the cover plate 32 from the outboard surface 82 (e.g., via an indenting tool). The recess/protrusion pairs may serve to protect the cover plate against failure as described below.

Figure 5:
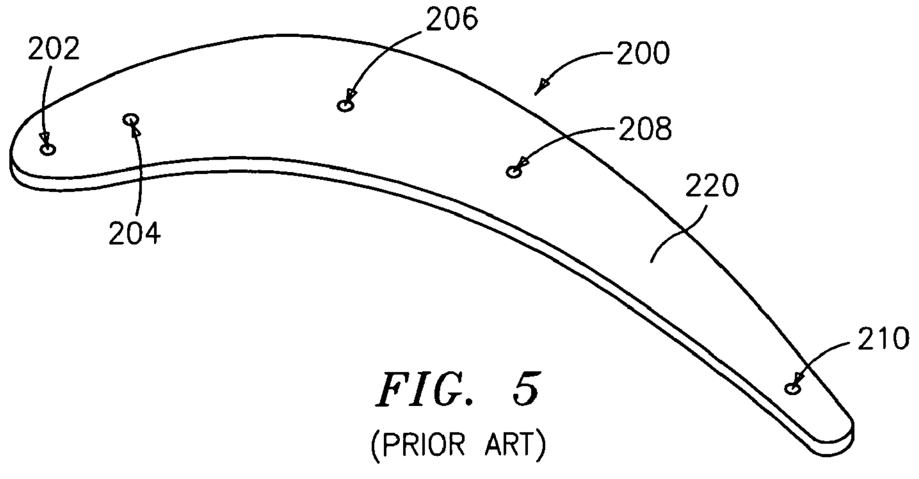
FIG. 5 (PRIOR ART)
FIG. 5 is a view of a prior art cover plate.

FIG. 5 shows an otherwise similar cover plate 200 lacking the recess/protrusion pairs. The cover plate 200 has similarly positioned through-apertures 202, 204, 206, 208, and 210 to those of the first cover plate 32. In operation, a failure mode has been observed to induce formation of one or more cracks 220. Uneven cooling of the cover plate 32 may increase the impact of cyclical heating and resultant thermal/mechanical fatigue. This fatigue may combine with chemical (e.g., oxidative) and erosive mechanisms to form the cracks 220. The presence of the protrusions tends to locally increase heat transfer to the cooling air flowing through the passageway network 50. The associated recesses may have a much lower, if any, effect on heat transfer on the outboard side of the plate. The recesses, however, may provide structural advantages (e.g., as distinguished from a protrusion-only situation such as a cast-in-place or deposited protrusion). First, the recesses reduce mass and, therefore, inertial (e.g., centrifugal) forces. Second, the inward orientation of the recess/protrusion pairs may increase structural rigidity against outward (e.g., centrifugal) forces (e.g., by acting as an arch under compression rather than a catenary under tension).

The recesses may be positioned and dimensioned in view of a particular airfoil configuration and engine operating parameters to provide a desired fatigue relief. Typically, these may be positioned relatively near locations where failures would otherwise begin (e.g., areas subjected to high or high cycle amplitude temperatures and stresses). For example, this may typically be relatively nearer to the mean line of the airfoil section (e.g., within 20% of a distance from the mean line to the pressure or suction side perimeter portion). The location may also be relatively downstream along a cooling flowpath as the cooling air at such locations is otherwise less effective (e.g., toward the downstream end of a space between adjacent wall ends 56). Exemplary recess depths and protrusion heights are 30–200% of an adjacent plate thickness (e.g., about 100%). Exemplary transverse dimensions (i.e., diameter for a circular-sectioned recess/protrusion) are measured at the outboard surface for the recess and the inboard surface for the protrusion. An exemplary maximum transverse recess dimension is no more than 500% of an adjacent plate thickness. With possible non-circular recesses in mind, an exemplary minimum transverse recess dimension is no less than 50% of the maximum transverse recess dimension.

One or more embodiments of the present invention have been described. Nevertheless, it will be understood that various modifications may be made without departing from the spirit and scope of the invention. For example, many details will be application-specific. To the extent that the principles are applied to existing applications or, more particularly, as modifications of existing blades, the features of those applications or existing blades may influence the implementation. Accordingly, other embodiments are within the scope of the following claims.

What is claimed is:

1. A blade comprising:
an airfoil body having:
an internal cooling passageway network; and
a body tip pocket; and
at least one plate secured within the body tip pocket and having:
an inboard surface; and
an outboard surface;
wherein the at least one plate has:
a recess in the outboard surface; and
a protrusion on the inboard surface associated with the recess.

2. The blade of claim 1 wherein: the recess has a depth of 30–200% of an adjacent thickness of the plate; and the protrusion has a height of 30–200% of an adjacent thickness of the plate.

3. The blade of claim 1 wherein:
the recess has maximum transverse dimension of no more than 500% of an adjacent thickness of the plate; and
the recess has minimum transverse dimension of no less than 50% of said maximum transverse dimension.

4. The blade of claim 1 having a plurality of such recesses and a plurality of such protrusions in combination opposite each other.

5. The blade of claim 1 wherein: said recesses have centers within 20% of a distance from a mean line of the at least one plate to an adjacent side perimeter portion of the at least one plate.

6. The blade of claim 1 wherein:
said at least one plate is a single plate.

7. The blade of claim 1 wherein:
said at least one plate has a perimeter; and
said at least one plate is welded to the airfoil body along at least 90% of said perimeter.

8. The blade of claim 1 wherein:
said at least one plate has a perimeter; and
said at least one plate is welded to the airfoil body along essentially an entirety of said perimeter.

9. The blade of claim 1 wherein:
said body tip pocket is in communication with the cooling passageway network via a plurality of ports; and
said at least one plate has at least one through-aperture; and
said a least one plate is secured subflush within the body tip pocket, so as to leave a blade tip plenum.

10. The blade of claim 1 wherein:
said body tip pocket has an uninterrupted perimeter wall.

11. The blade of claim 1 wherein:
there are no recess-protrusion pairs with the recess in the inboard surface and the protrusion in the outboard surface.

12. A blade comprising:
an airfoil body having:
an internal cooling passageway network; and
having a body tip pocket in communication with the cooling passageway
network via a plurality of ports; and
at least one plate secured within the body tip pocket, subflush to the tip so as to leave a blade tip pocket adjacent the tip and at least partially blocking at least some of the plurality of ports and having means for relieving cyclic thermal stresses wherein:
the means comprises plurality of aligned pairs of outboard surface recesses and inboard surface protrusions.

13. The blade of claim 12 wherein:
the body consists in major part of a nickel- or cobalt-based superalloy; and
the plate consists essentially of a nickel- or cobalt-based superalloy.

14. A method for manufacturing a blade comprising:
forming a blade body, including a casting step;
forming a plate, including indenting a plurality of indentations in a first surface of the plate;
inserting the plate in a tip pocket of the body; and
securing the plate to the body.

15. The method of claim 14 further comprising:
drilling a plurality of through-apertures in the plate.

16. The method of claim 14 wherein:
the indenting produces a plurality of protrusions from a second surface, opposite the first surface.

17. The method of claim 14 wherein:
the securing comprises welding along a perimeter of the plate.

18. The method of claim 14 further comprising:
installing the blade on a gas turbine engine in place of a prior blade, the prior blade lacking said plurality of indentations.

19. The method of claim 14 wherein:
the indenting is only in the first surface and not in an opposite second surface.

20. A method for reengineering a turbine engine blade configuration from a first configuration to a reengineered configuration, the first configuration comprising:
an airfoil body having:
an internal cooling passageway network; and
having a body tip pocket in communication with the cooling passageway
network via a plurality of ports; and
a plate having essentially fiat inboard and outboard surfaces and secured
within the body tip pocket, subflush to the tip so as to leave a blade tip pocket
adjacent the tip and at least partially blocking at least some of the plurality of
ports, the method comprising:
in one or more iterations providing the reengineered configuration comprising:
an airfoil body having:
an internal cooling passageway network; and
having a body tip pocket in communication with the cooling
passageway network via a plurality of ports; and
a plate having inboard and outboard surfaces and secured within the body tip pocket, subflush to the tip so as to leave a blade tip pocket adjacent the tip and at least partially blocking at least some of the plurality of ports and having at least one surface enhancement effective to improve resistance to thermal/mechanical fatigue relative to the first configuration wherein: the surface enhancement includes an indentation.

21. The method of claim 20 wherein:

the reengineered configuration airfoil body is essentially unchanged relative to the first configuration airfoil body.

* * * * *

UNITED STATES PATENT AND TRADEMARK OFFICE

CERTIFICATE OF CORRECTION

PATENT NO. : 7,175,391 B2
APPLICATION NO. : 10/888125
DATED : February 13, 2007
INVENTOR(S) : Wieslaw A. Chlus et al.

It is certified that error appears in the above-identified patent and that said Letters Patent is hereby corrected as shown below:

In column 5, claim 9, line 64, after “said” delete “a” and insert --at--.

Signed and Sealed this

Eighteenth Day of December, 2007

JON W. DUDAS
*Director of the United States Patent and Trademark Office*